United States Patent [19]

Suzuki et al.

[11] Patent Number: 4,788,956
[45] Date of Patent: Dec. 6, 1988

[54] METHOD OF DETECTING ABNORMALITY IN CRANK ANGLE SIGNAL OF INTERNAL COMBUSTION ENGINES

[75] Inventors: Yoshio Suzuki, Wakoh; Shigehiro Kimura, Niiza, both of Japan

[73] Assignee: Honda Giken Kogyo Kabushiki Kaisha, Tokyo, Japan

[21] Appl. No.: 866,603

[22] Filed: May 23, 1986

[30] Foreign Application Priority Data

May 31, 1985 [JP] Japan .................................. 60-117971

[51] Int. Cl.$^4$ .......................... F02P 5/15; F02P 11/00
[52] U.S. Cl. ..................................... 123/414; 73/116; 364/431.11
[58] Field of Search ............... 123/414, 416, 417, 479; 73/116; 364/431.11; 324/380

[56] References Cited

U.S. PATENT DOCUMENTS

| | | | |
|---|---|---|---|
| 4,395,905 | 8/1983 | Fujimori et al. | 123/479 |
| 4,485,784 | 12/1984 | Fujii et al. | 123/414 |
| 4,628,882 | 12/1986 | Sakurai et al. | 123/479 |
| 4,664,082 | 5/1987 | Suzuki | 123/414 |

FOREIGN PATENT DOCUMENTS 55-142233  11/1980  Japan ............................... 73/116

Primary Examiner—Andrew M. Dolinar
Attorney, Agent, or Firm—Lyon & Lyon

[57] ABSTRACT

A method of detecting an abnormality in a crank angle signal of an internal combustion engine having a crankshaft. The method comprises the steps of monitoring the condition of a first reference position signal generated at a predetermined crank angle position of the crankshaft and the condition of a second position signal generated whenever the crankshaft rotates through a predetermined rotational angle, setting a first flag to a predetermined logical state if the first reference position signal is generated before the second position signal is generated a predetermined number of times after generation of the first reference position signal, setting a second flag to a predetermined logical state if the first reference position signal is not generated after the second position signal has been generated said predetermined number of times after generation of the first reference position signal and before an immediately succeeding generation of the second position signal; and detecting an abnormality in one of the first reference position signal and second position signal based on a predetermined combination of logical states exhibited by the first and second flags.

17 Claims, 5 Drawing Sheets

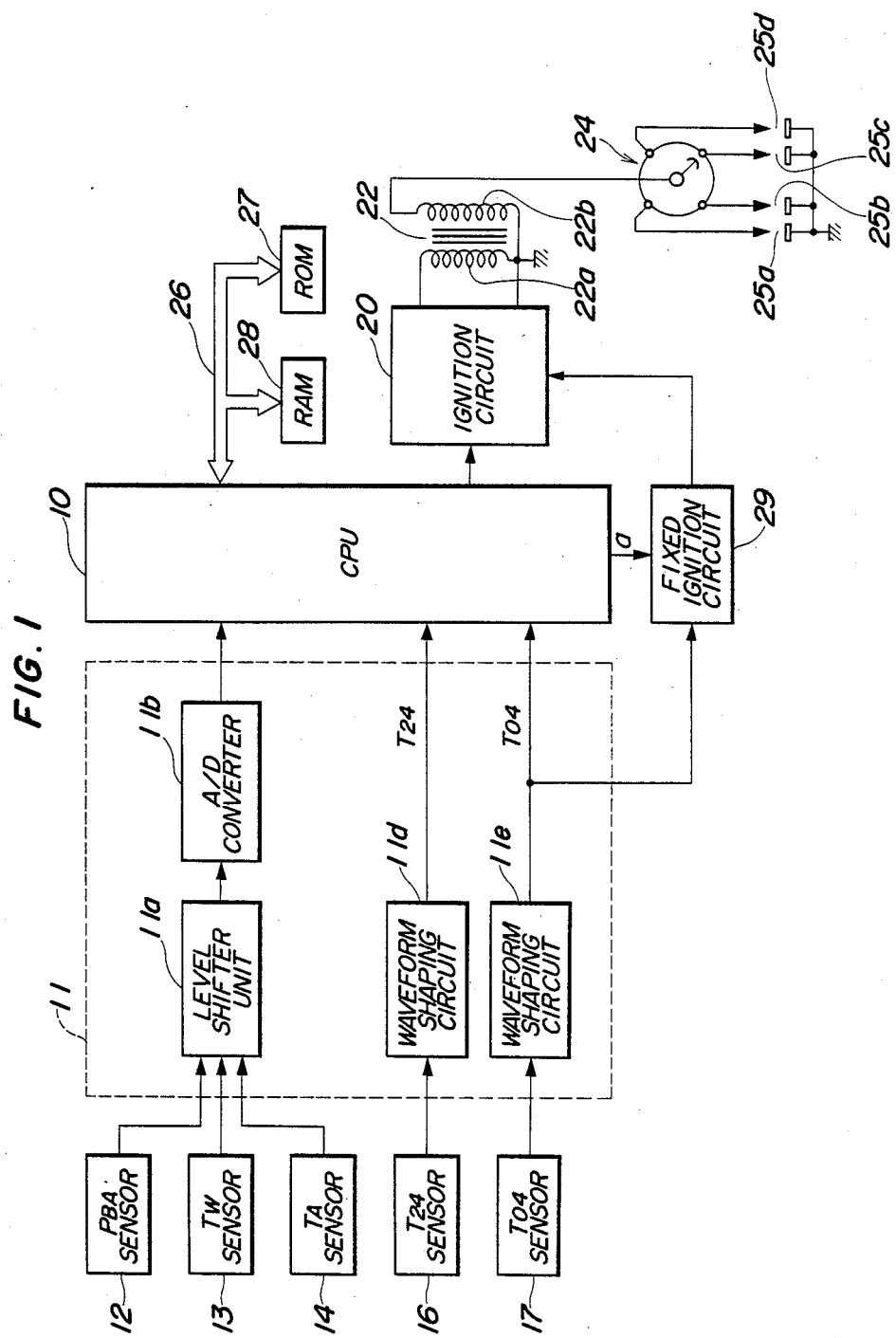

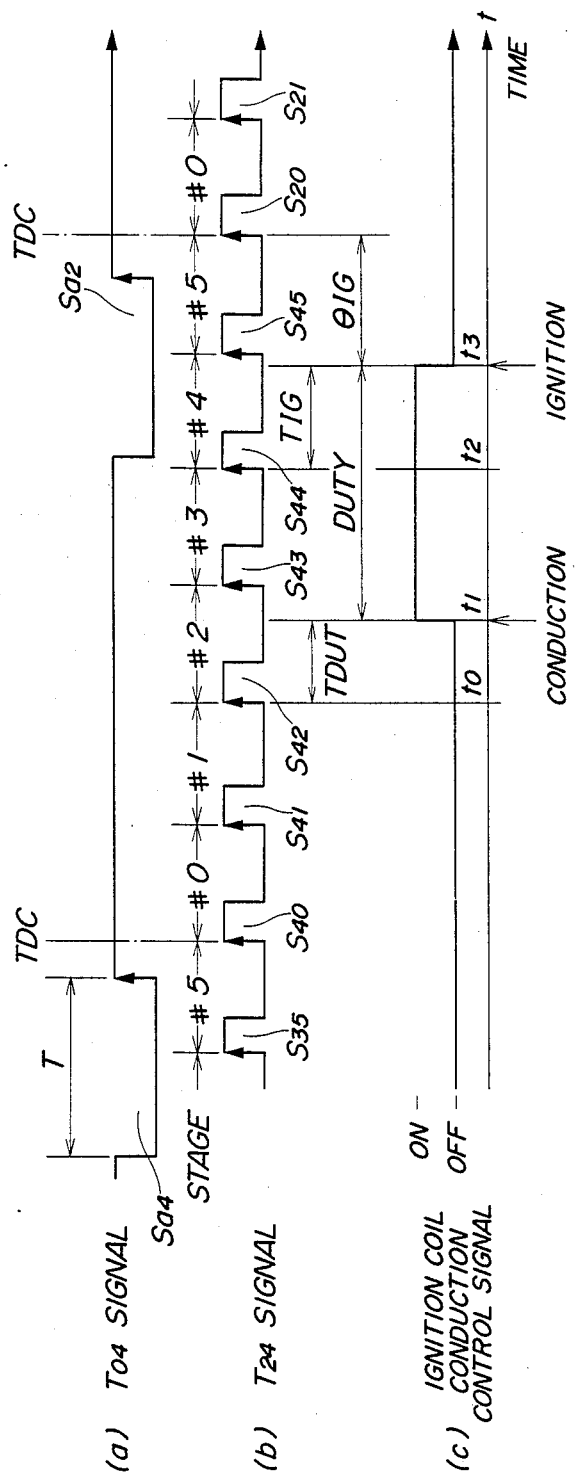

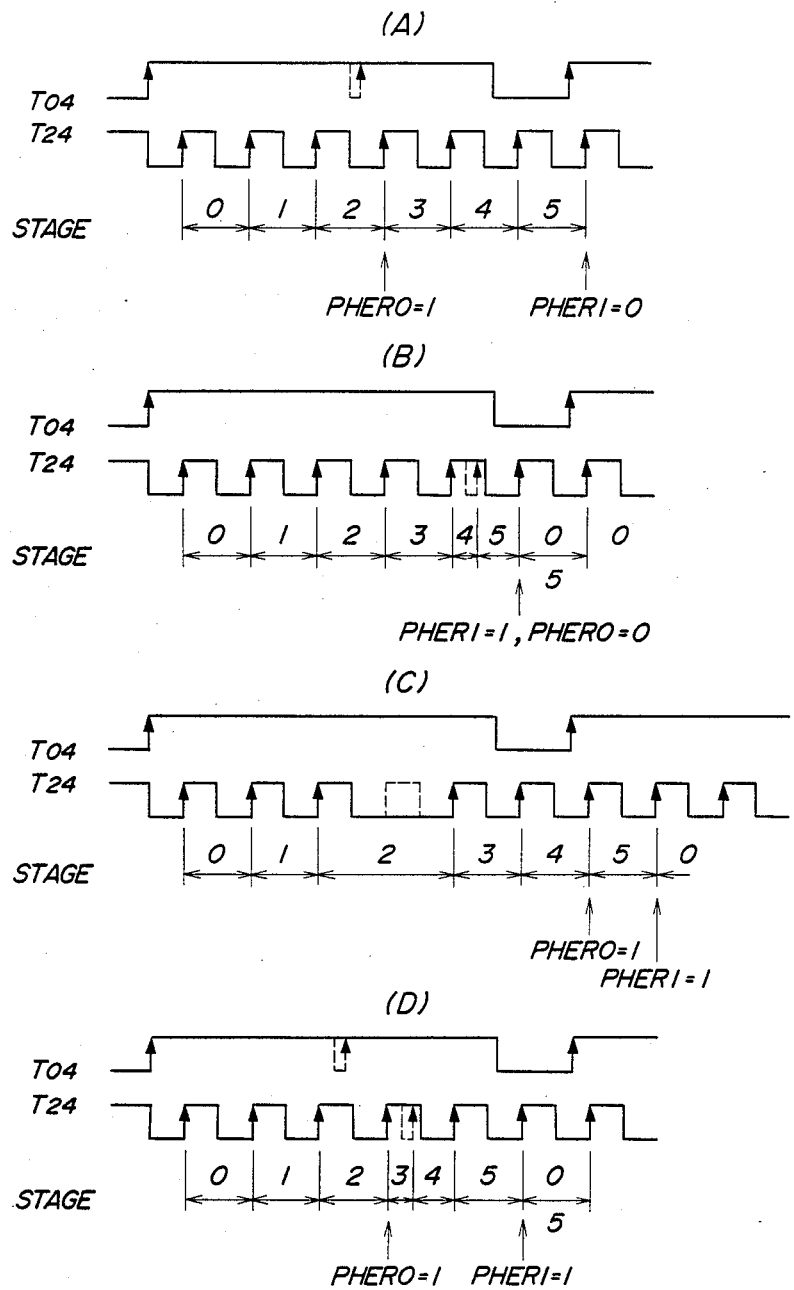

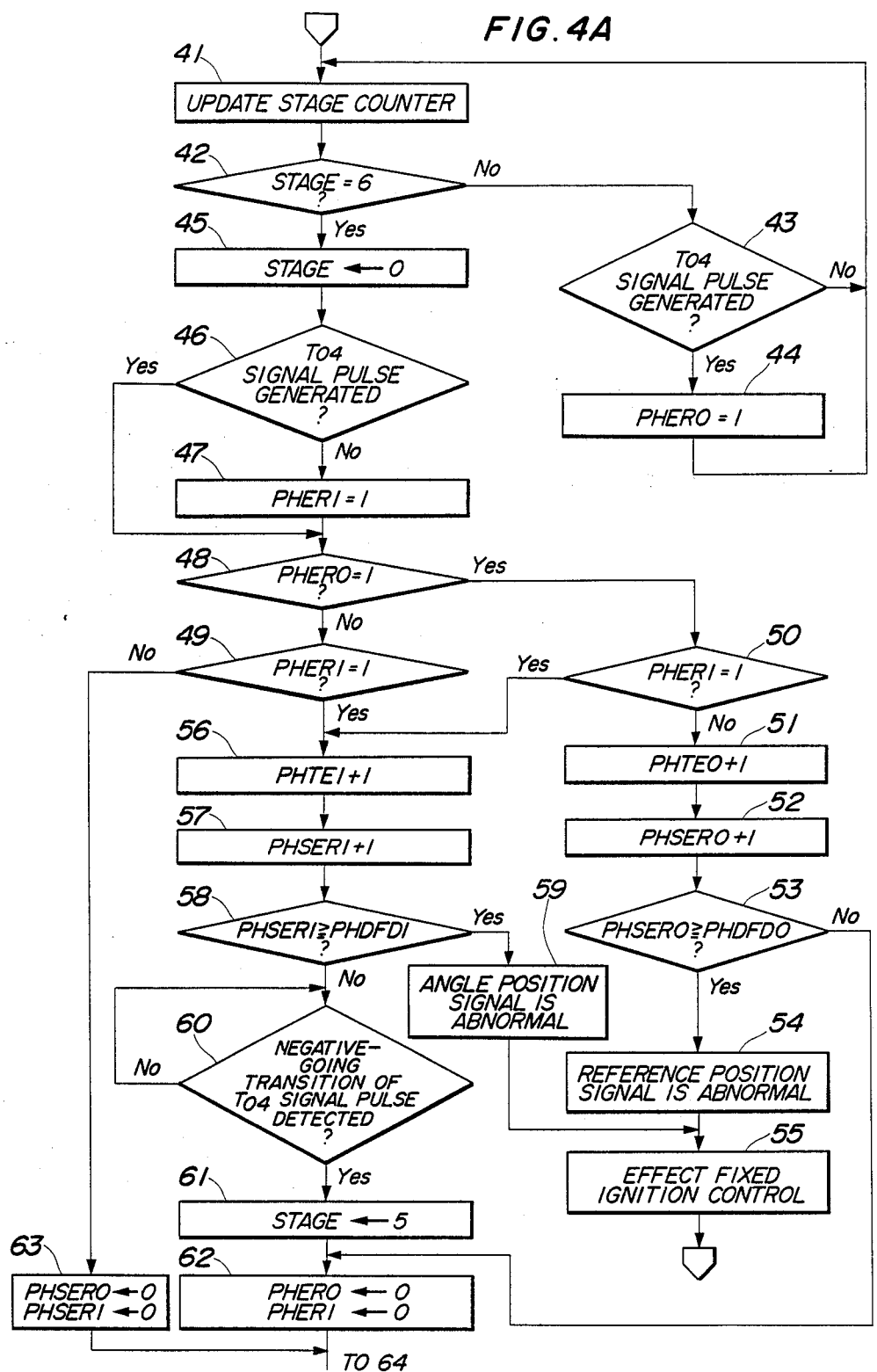

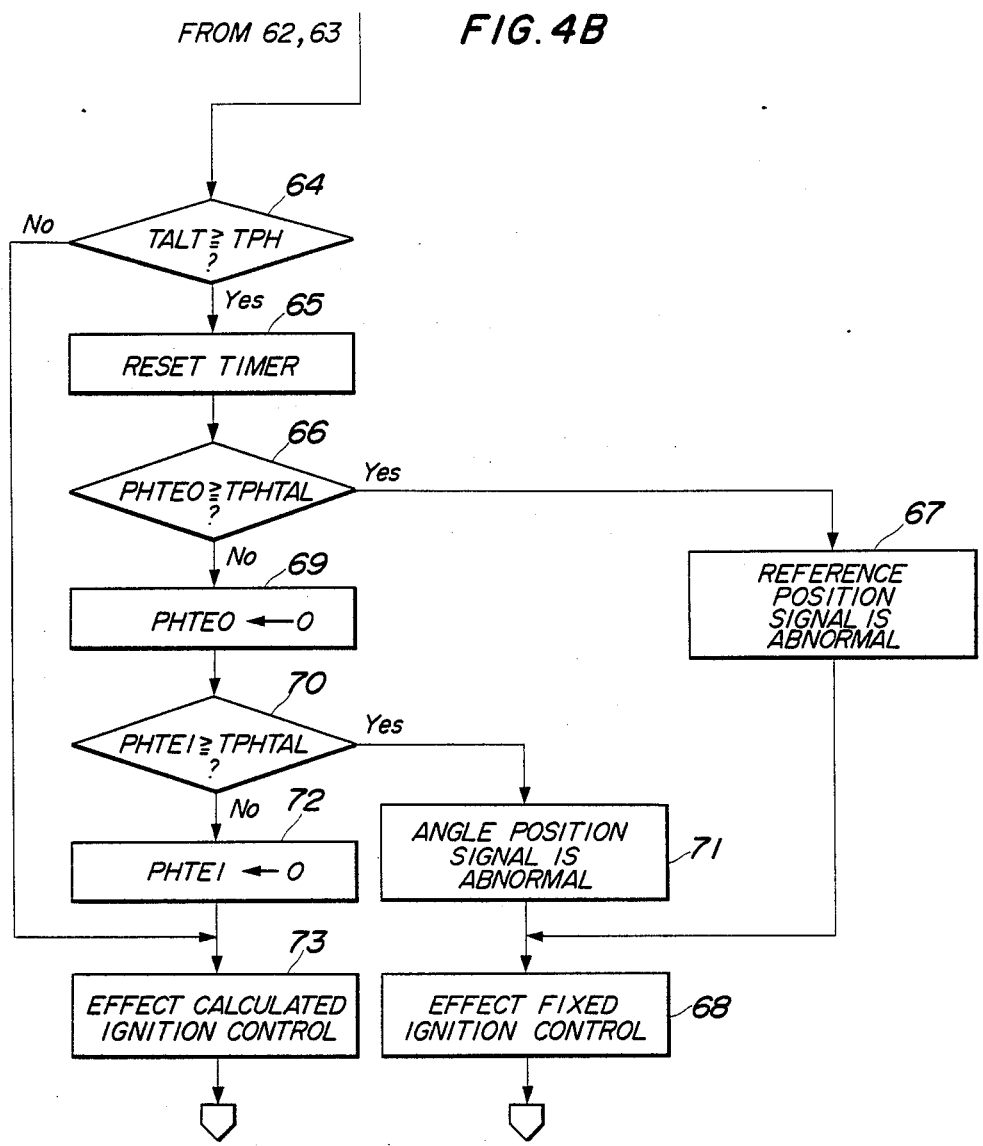
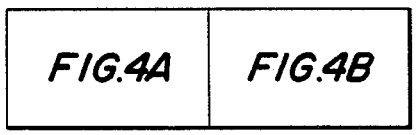

METHOD OF DETECTING ABNORMALITY IN CRANK ANGLE SIGNAL OF INTERNAL COMBUSTION ENGINES

BACKGROUND OF THE INVENTION

This invention relates to a method of detecting a crank angle signal abnormality applicable to the electronic control unit of an internal combustion engine.

Control signals which accurately represent the crank angle position of the crankshaft of an internal combustion engine are used by an electronic control unit, such as a fuel injection control unit or ignition timing control unit, to control the operation of the engine. These control signals include a cylinder discriminating signal for specifying one of the plural cylinders of the engine, a reference position signal indicative of a predetermined crank angle position, e.g. top dead center (TDC) at the end of the compression stroke, which serves as a reference for controlling each cylinder, and an angle position signal generated whenever the crankshaft rotates through a predetermined angle to give an indication of the crank angle position.

An automotive vehicle having an internal combustion engine is equipped with a window wiper motor, an ignition system, a starter, warning devices and the like. If noise produced by these items of equipment when they are operated is superimposed on any of the three control signals mentioned above, difficulty is encountered in controlling the operation of the engine. This is particularly the case if noise is superimposed on the reference position signal or crank angle position signal, for any abnormality in these signals makes it difficult to determine an accurate ignition advance angle when controlling ignition timing. This can have an adverse upon the engine.

SUMMARY OF THE INVENTION

It is therefore an object of the invention to provide a method of detecting an abnormality in a crank angle signal of an internal combustion engine, whereby an abnormality in at least a crankshaft reference position signal and angle position signal can be detected through a simply constructed arrangement.

According to the present invention, the foregoing object is attained by providing a method of detecting an abnormality in a crank angle signal of an internal combustion engine having a crankshaft, the method comprising the steps of monitoring the condition of a first reference position signal generated at a predetermined crank angle position of the crankshaft and the condition of a second position signal generated whenever the crankshaft rotates through a predetermined rotational angle; setting a first flag to a predetermined logical state if the first reference position signal is generated before the second position signal is generated a predetermined number of times after generation of the first reference position signal; setting a second flag to a predetermined logical state if the first reference position signal is not generated after the second position signal has been generated said predetermined number of times after generation of the first reference position signal and before an immediately succeeding generation of the second position signal; and detecting an abnormality in one of the first reference position signal and second position signal based on a predetermined combination of logical states exhibited by the first and second flags.

Thus, whether the first reference position signal or second position signal of the engine is abnormal can be accurately determined, through a simple arrangement, on the basis of the first and second flags.

The method of the invention can be applied to an electronic control unit having first ignition control means for setting ignition timing at an optimum value in dependence upon engine operating parameters, and second ignition control means for effecting ignition control dependent solely upon the first reference position signal, which is generated at the predetermined reference crank angle position corresponding to each cylinder of the engine. If the crank angle signal is detected to be abnormal, the electronic control unit effects a changeover from the first ignition control means to the second ignition control means, whereby it is possible to provide fail-safe operation of the engine.

The above and other objects, features and advantages of the invention will be apparent from the following description taken in conjunction with the accompanying drawings, in which like reference characters designate the same or similar elements or parts throughout the figures thereof.

BRIEF DESCRIPTION OF THE DRAWINGS

FIG. 1 is a block diagram illustrating the overall construction of an ignition timing control system for an internal combustion engine to which the method of present invention is applied;

FIG. 2 is a timing chart illustrating the timing at which a T04 signal and a T24 signal are generated, as well as the timing at which an ignition advance angle value $\theta IG$ is calculated;

FIGS. 3(A), (B), (C) and (D) are waveform diagrams each showing the appearance of the T04 and T24 signals when these signals exhibit an abnormal condition; and Figs. 4, 4A and 4B is a flowchart illustrating a manner of detecting an abnormality in the T04 and T24 signals.

DETAILED DESCRIPTION

A preferred embodiment of the invention will now be described with reference to FIGS. 1 through 4.

FIG. 1 illustrates the overall construction of an ignition timing control system to which the present invention is applied. The illustrated ignition timing control system is for controlling the ignition timing of a four-cylinder internal combustion engine, not shown, and includes a central processing unit (hereafter referred to as "CPU") 10 having an input side to which sensors for sensing various parameters are connected via an input circuit 11. These sensors include a T04 sensor 17 arranged in facing relation, for example, to an engine camshaft, not shown, for generating a T04 signal pulse indicative of a reference crank angle position of each engine cylinder. The TO4 signal pulse (FIG. 2) has a pulse width T whose negative-going transition occurs at a first crank angle position of, for example, 50° before top dead center (referred to as "BTDC") at the end of the compression stroke of each cylinder, and whose positive going transition occurs at a second crank angle position of, for example, 10° BTDC. The T04 sensor 17 is connected to the CPU 10 through a waveform shaping circuit 11e in the input circuit 11. The waveform shaping circuit 11e receives T04 signal pulses from the T04 sensor 17 and shapes the pulses into rectangular pulses Sa4, Sa2, shown in FIG. 2(a), which are applied to the CPU 10.

A T24 sensor 16 which, like the T04 sensor 17, is arranged in facing relation to the camshaft, is adapted to generate 24 equally spaced pulses (i.e., pulses produced at a 30° interval in terms of the angle) during one full revolution of the camshaft, namely two full revolutions of the crankshaft, which is not shown. The T24 sensor 16 is connected to the CPU 10 via a waveform shaping circuit 11d, whereby the T24 signal pulses, shown in FIG. 2(b), are shaped before being applied to the CPU 10.

The remaining sensors include an absolute pressure (PBA) sensor 12 for sensing absolute pressure PBA in an intake pipe downstream of the engine throttle valve, neither of which are shown, an engine coolant temperature (TW) sensor 13 mounted in the peripheral wall of a cylinder filled with the engine body cooling water or coolant for sensing the coolant temperature TW, and an intake air temperature (TA) sensor 14 for sensing intake air temperature TA in the intake pipe downstream of the engine throttle valve. These sensors 12, 13, 14 are connected to the CPU 10 via a level shifter unit 11a and an A/D converter 11b of the input circuit 11. The absolute pressure sensor 12, engine coolant temperature sensor 3 and intake air temperature sensor 14 produce analog output signals each of which is shifted to a predetermined voltage level by the level shifter unit 11a. Each analog signal so shifted is then converted into a digital signal by the A/D converter 11b before being fed into the CPU 10.

Connected to the output side of the CPU 10 is an ignition circuit 20 for supplying a primary coil 2a of an ignition coil 22 with coil excitation power. The ignition coil 22 has a secondary coil 22b connected to spark plugs 25a–25d of respective cylinders via a distributor 24.

Connected between the waveform shaping circuit 11e and the ignition circuit 20 is a fixed ignition circuit 29 which, along with the CPU 10, is supplied with the T04 signal from the waveform shaping circuit 11e. The fixed ignition circuit 29 is also connected to the output side of the CPU 10 and is switched between an operation-inhibit mode and an operative mode in response to a changeover signal a issued by the CPU 10. When placed in the operative mode, the fixed ignition circuit 29 supplies the primary coil 22a via the ignition circuit 20 with coil energizing power for a period of time equivalent to the pulse width T of the T04 signal.

Also connected to the CPU 10 via a bus 26 are a ROM 27 storing an operational program and the like, and a RAM 28 for temporarily storing the results of calculations executed by the CPU 10 in accordance with the operational program, as well as other data.

The operation of the ignition timing control system constructed as set forth above will now be described. Let us refer to FIG. 2 to describe ignition timing control under normal operating conditions, that is, when the T04 and T24 signals are both normal.

On the basis of the T04 signal from the T04 sensor 17 and the T24 signal from the T24 sensor 16, the CPU 10 senses crank angle stages (hereafter referred to simply as the "stage positions") located between the reference crank angle position of each cylinder of the engine which is reached immediately before completion of a compression stroke and the reference crank angle position of the next cylinder within which spark ignition should be effected. More specifically, if the T24 signal pulses S40 and S20 [(b) of FIG. 2]sensed immediately after the T04 signal pulses Sa4, Sa2 of (a) of FIG. 2 are generated, respectively, are assumed to be generated at the TDC position at the end of the compression stroke of the fourth and second cylinders of the engine, respectively, then, the CPU 10, in response to generation of the T04 signal pulse Sa4, will sense the reference crank angle position of the fourth cylinder, and, in response to the T24 signal pulse S40 immediately after the generation of the T04 signal pulse Sa4, will sense an initial crank angle position, namely a #0 stage position, which is one of six stages into which the interval between the reference crank angle position of the fourth cylinder and the following reference crank angle position of the second cylinder is divided. The time period between the leading edge of the T24 signal pulse S40 (which is generated at the TDC position in the illustrated embodiment) and the T24 signal pulse S41 in FIG. 2(b) is defined as the #0 stage position mentioned above. The other stage positions #1–#5 are likewise defined. The CPU 10 proceeds to sense a 1 stage position, a #2 stage position and so on in response to the T24 signal pulses S41, S42 . . . , respectively, applied thereto.

Upon sensing a predetermined stage position (e.g. the #1 stage position)., the CPU 10 performs computations based on the output signals from the parameter sensors to determine an ignition timing or advance angle $\theta IG$, an ignition coil conduction time DUTY and other required quantities. The ignition advance angle $\theta IG$ is computed by use of the following equation:

$$\theta IG = \theta MAP + \theta IGCR \quad (1)$$

The ignition advance angle $\theta IG$ is expressed in terms of the crank angle before a crank angle position, e.g. TDC position, at which a T24 signal pulse, e.g. S20 in (b) of FIG. 2 is generated immediately after a T04 signal pulse, e.g. Sa2 [FIG. 2(a)]indicative of the reference crank angle position of a cylinder, e.g. the second cylinder, within which ignition should be effected. $\theta MAP$ represents a basic ignition timing or ignition advance angle which is determined as a function of engine rotational speed (rpm) Ne and a parameter representing engine load, such as the absolute pressure PBA within the intake pipe. More specifically, a value commensurate with the sensed value PBA of absolute pressure and the sensed value Ne of engine rpm is read as the value of $\theta MAP$ from an Ne-PBA-$\theta IG$ map stored in the ROM 27. It should be noted that the engine rpm Ne is calculated by measuring the time interval of each stage, namely the pulse generation interval ME6i of the T24 signal pulses, by counting clock pulses of a predetermined period during this interval, obtaining an Me value (=ME60+ME61+. . . +ME65), which is the sum of the values of ME6i counted for each stage, and taking the reciprocal of the value Me obtained. $\theta IGCR$ represents an advance delay angle correction amount determined by such factors as the engine coolant temperature TW and intake air temperature TA.

Next, the CPU 10 computes the conduction time DUTY of the primary coil 22a of the ignition coil 22. The conduction time DUTY is set to a value deemed to be optimum from the standpoint of preventing both overheating of the coil and misfire of the spark plugs. In general, DUTY is obtained as a function of the engine rpm Ne.

The CPU 10 then proceeds to compute the conduction initiation timing TDUT and conduction termination timing TIG of the primary coil 22a based on the ignition advance angle $\theta IG$ and conduction time DUTY found in the manner set forth above. To accomplish this, the CPU 10 first counts back, from a TDC position immediately after the reference crank angle position of the second cylinder within which the ignition should be effected, a crank angle position [a position corresponding to instant t1 in FIG. 2(c)] at which conduction of the primary coil $\theta 22a$ is to start based on the ignition advance angle $\theta IG$ and conduction time DUTY, and determines which stage position is the crank angle position at which conduction is to start. The CPU 10 then finds the period of time needed for this crank angle position to be attained by rotation of the crankshaft from instant t0 [FIG. 2(c)], which is that at which the T24 signal pulse S42 in the determined stage position (the #2 stage position in the illustrated embodiment) enters the CPU 10. This period of time is the conduction initiation timing TDUT. Likewise, the CPU 10 determines which stage position is the crank angle position [a position corresponding to the instant t3 in FIG. 2(c)] at which conduction of the coil 22a is to be terminated based on the ignition angle $\theta IG$. The CPU 10 then finds the period of time needed for this crank angle position to be attained by rotation of the crankshaft from instant t2, which is that at which the T24 signal pulse S44 in the determined stage position (the #4 stage position in the illustrated embodiment) enters the CPU 10. This period of time is the conduction termination timing TIG.

The CPU 10 has internal counters (not shown) used in the process for initiating and terminating conduction of the primary coil 22a. Using the conduction initiating counter, the CPU 10 waits for the lapse of the conduction ignition time period TDUTY extending from detection (instant t0) of the T24 signal pulse (S42) of the stage position at which conduction of the primary coil 22a is to start, and applies a conduction control signal to the ignition circuit 20 at the instant (t1) the period of time TDUT expired. Then, using the conduction terminating counter, the CPU 10 waits for the lapse of the conduction termination time period TIG extending from detection (instant t2) of the T24 signal pulse (S44) of the stage position at which conduction of the primary coil 22a is to stop, and removes the conduction control signal from the ignition circuit 20 at the instant (t3) the period of time TIG expires.

The ignition circuit 20 supplies the primary coil 22a of ignition coil 22 with the coil excitation power for the period of time during which the CPU 10 supplies the ignition circuit 20 with the conduction control signal. When supply of the coil excitation power is cut off by the ignition circuit 20, a high voltage is produced in the secondary coil 22b of ignition coil 22 and is supplied to a spark plug (spark plug 25c in the illustrated, embodiment) by the distributor 24, thereby firing the spark plug by causing it to produce a spark discharge.

In the event that the T04 signal or T24 signal develops an abnormality, ignition timing control includes sensing the abnormality and then compensating for it via the fixed ignition circuit 29.

An automotive vehicle equipped with an internal combustion engine has various sources of noise, such as an ignition system, starter and window wiper motor, as mentioned earlier. FIG. 3 shows examples of the kinds of abnormality the T04 signal or T24 signal can develop when influenced by noise emitted from these noise sources. In (A) of FIG. 3, the T24 signal is normal but the T04 signal develops a noise-induced erroneous pulse at a position, indicated by the broken lines, which is not a normal position for generation of a pulse. The solid line indicates the normal pulse generation positions. Conversely, in (B) of FIG. 3, the T04 signal is normal but the T24 signal includes noise, as indicated by the broken lines, so that more than the correct-number of pulses are generated. Likewise, the T04 signal is normal in FIG. 3(C) but the T24 signal is missing a pulse, so that less than the correct number of pulses is generated. In (D) of FIG. 3, the T04 signal develops a pulse at an incorrect position indicated by the broken lines owing to the influence of noise, and the T24 signal includes a noise pulse of the kind indicated by the broken lines. These abnormalities in the T04 and T24 signals are detected in the manner shown in the flowchart of FIG. 4.

The first step of the flowchart is a step 41, which calls for the CPU 10 to update a stage counter whenever a T24 signal pulse is generated. The stage counter counts the #0 stage in response to a T24 signal pulse (the pulse S40 in the embodiment of Fig 2) generated immediately after the positive-going transition of the normal T04 signal pulse, and thereafter successively counts the #1 stage in response to the S41 pulse, #2 stage in response to the S42 pulse, and so on. While the stage counter is performing this counting operation, the CPU 10 determines at a step 42 whether the presently prevailing count STAGE is a value of six, namely whether the presently prevailing count is a numerical value indicative of the 6th stage, namely the end of the #5 stage. If the decision rendered at the step 42 is negative, it is determined at a step 43 whether a T04 signal pulse has been generated. If the answer obtained here is NO, the program returns to the step 41; if the answer is YES, then this signifies that the T04 signal pulse has been generated at an incorrect position, which is indicated by the relationship between the positions at which the T20 and T04 signal pulses are generated. When such is the cast, the CPU 10 sets a malfunction indicating flag PHER0 to logical "1" at a step 44, after which the program returns to the step 41. Thus, the flag PHER0 is set to "1" if the T04 signal pulse occurs before six of the T24 signal pulses are generated.

Next, when the prevailing count STAGE in the stage counter attains a value of six, a YES answer is obtained at the step 42, so that the STAGE value in the stage counter is made zero at a step 45. The program then proceeds to a step 46, at which it is determined whether a T04 signal pulse has been generated, that is, whether the STAGE value of zero prevails immediately after generation of a T04 signal pulse. If the answer is YES, then it is decided that the T04 and T24 signal pulses have been generated in the correct positional relationship, and the program skips a step 47 and proceeds to a step 48. If the answer at the step 46 is NO, however, then a flag PHER1 is set to logical "1" at the step 47 before the program proceeds to the step 48.

When both of the flags PHER0, PHER1 have been set to either "0" or "1" in the above-described manner, the program proceeds to a step 48 for determining whether the flag PHER0 is "1", and then to a step 49 or a step 50 for determining whether the flag PHER1 is "1". The processing that follows depends upon the combination of logical states of these flags PHER0, PHER1.

First, if the answer at the step 48 is YES and the answer at the step 50 is NO, that is, if flag PHER0 is logical "1" and flag PHER1 is logical "0" [which corresponds to the case shown in (A) of FIG. 3], then a total error counter PHTE0 and a consecutive error counter PHSER0, which will be described below, are each incremented by 1 at steps 51, 52, respectively. The total error counter PHTE0 is for counting the number of times the flags PHER0, PHER1 exhibit the combination of logical states (1,0) in a predetermined monitoring time period (e.g. 150 sec). The consecutive error counter PHSER0 is for counting the number of times the flags PHER0, PHER1 exhibit the combination (1,0) consecutively in a period of time during which a predetermined number (e.g. 15) of the T04 signal pulses are generated.

A step 53 calls for a determination as to whether the count presently prevailing in the consecutive error counter PHSER) is greater than or equal to a discrimination value PHDFD0 (e.g. the above-mentioned value of 15). In other words, it is determined whether the combination "1", "0" has occurred continuously in a period of time during which 15 of the T04 pulses are generated. If the answer is YES at the step 53, then it is decided at a step 54 that the reference position signal (the T04 signal) is in an abnormal condition due to the influence of noise or the like, and the program proceeds to a step 55 at which ignition control is changed over from the above-described ignition timing control (hereafter referred to as "calculated ignition control") that prevails during normal operation, to fixed ignition control. More specifically, the CPU 10 delivers a change-over signal a (FIG. 1) to the fixed ignition circuit 29 to place it in the operative mode. The fixed ignition circuit 29 then proceeds to execute a so-called "fail-safe" operation by controlling the conduction of the ignition coil 22 at a predetermined crank angle position, which is determined by the position at which a T04 signal pulse is generated, over a time interval equivalent to the pulse width T. Though the T04 signal exhibits an abnormal condition, namely the occurrence of a pulse at an incorrect position due to the influence of noise in the case presently being discussed, the width of this extraneous pulse is sufficiently small in comparison with the pulse width T of the T04 signal. Accordingly, the influence of noise can be eliminated by changing over ignition control from calculated ignition control to fixed ignition control.

If the answer at the step 48 is NO and the answer at the step 49 is YES, that is, if the logical states of flags PHER0, PHER1 are a combination (0,1) [which corresponds to the case shown in (B) of FIG. 3], or if the answer at the step 48 is YES and the answer at the step 50 is YES, that is, if the logical states of flags PHER0, PHER1 are a combination (1,1) [which corresponds to (C) and (D) of FIG. 3], then a total error counter PHTE1 and a consecutive error counter PHSER1 are each incremented by 1 at steps 56, 57, respectively. The total error counter PHTE1 is for counting the number of times the combination (0,1) or (1,1) occurs in a predetermined monitoring time period (e.g. 150 sec). The consecutive error counter PHSER1 is for counting the number of times the combination (0,1) or-(1,1) occurs consecutively in a period of time during which a predetermined number (e.g. 5) of the T04 signal pulses are generated.

Following the step 57, the program proceeds to a step 58, at which it is determined whether the count presently prevailing in the consecutive error counter PHSER1 is greater than or equal to a discrimination value PHDFD1 (e.g. 5), that is, whether the combination (0,1) or (1,1) has occurred continuously for a period of time during which five pulses of the T04 signal have been generated. If an affirmative decision is rendered at the step 58, it is decided at a step 59 that the angle position signal (the T24 signal) is in an abnormal condition due to the influence of noise. The program then proceeds to the step 55, which calls for the CPU 10 to continue operation by fixed ignition control. If a NO answer is obtained at the step 58, then it is determined at a step 60 whether the negative-going transition of the T04 signal pulse has been detected. It the answer to step 60 is NO, the CPU 10 waits for the generation of the T04 signal pulse. When the T04 signal pulse is generated so that a YES answer is obtained at the step 60, the stage counter is reset at a step 61 in such manner that the count STAGE in the stage counter attains a value indicative of the #5 stage at the moment the negative-going transition of the T04 signal pulse occurs. The flags PHER0, PHER1 are then reset to "0" at the step 62 and the program proceeds to a step 64. Note that the count in the stage counter is reset at the step 61 in order to correct for an error in the number of pulses generated in the T24 signal due to the influence of noise.

If a NO answer is obtained at both of the steps 48, 49, this indicates that T04 and T24 signals are being generated in the correct positional relationship, so that the consecutive error counters PHSER0, PHSER1 are both reset to "0" at a step 63, after which the program proceeds to the step 64.

The foregoing relates to processing executed in a case where abnormalities of the kind shown in FIG. 3 occur continuously. If an abnormality occurs intermittently and frequently, however, a monitoring time period is set, a timer PH (e.g. a set timer value of 150 sec) is started and it is determined at a step 64 whether a currently prevailing timer value TALT is greater than or equal to the set timer value TPH. Until the currently prevailing timer value TALT reaches the set timer value TPH, the answer obtained at the step 64 is NO and the program proceeds to a step 73, at which calculated ignition control is executed, without steps 65 through 72 being executed. When the current timer value TALT reaches the set timer value TPH, a YES decision is rendered at the step 64. Accordingly, the timer TPH is reset at a step 65 and it is determined at a step 66 whether the count in the total error counter PHTE0, which is incremented by 1 each time the step 51 is executed, is greater than or equal to a discrimination value TPHTAL (e.g. a value equivalent to the generation of 40 of the T04 pulses). If a YES answer is obtained at the step 66, then the reference position signal (T04 signal) is judged to be abnormal at a step 67, just as at the step 54, and a changeover is effected to fixed ignition control: just as set forth above, at a step 68. If a NO answer is obtained at step 66 the total error counter PHTE0 is reset to zero at step 69. Next, it is discriminated at a step 70 whether the count in the total error counter PHTE1, which is incremented by 1 each time the step 56 is executed, is greater than or equal to the discrimination value TPHTAL. If the answer is YES, then the angle position signal (T24 signal) is judged to be abnormal at a step 71, just as at the step 59, and the program proceeds to the step 68. If a negative decision is rendered at the step 70, the count in the total error counter PHTE1 is reset to "0" at a step 72 and calculated ignition control is continued at the step 73.

It should be noted that although the consecutive error counters PHSER0, PHSER1 are adapted to count the number of times a predetermined combination occurs continuously during the time that a predetermined number of the T04 signal pulses are generated, it is also permissible to arrange these counters to count the number of times a predetermined combination occurs continuously during the time that a predetermined number of the T24 signal pulses are generated.

As many apparently widely different embodiments of the present invention can be made without departing from the spirit and scope thereof, it is to be understood that the invention is not limited to the specific embodiments thereof except as defined in the appended claims.

What is claimed is:

1. A method of detecting an abnormality in a crank angle signal of an internal combustion engine having a crankshaft, said abnormality being such that a pulse of the crank angle signal is missing or that a redundant pulse is superimposed on the crank angle signal, comprising the steps of:
    monitoring the condition of a first reference position signal generated at a predetermined crank angle position of the crankshaft and the condition of a second position signal generated whenever the crankshaft rotates through a predetermined rotational angle;
    setting a first flag to a predetermined logical state if the first reference position signal is generated before the second position signal is generated a predetermined number of times after generation of the first reference position signal;
    setting a second flag to a predetermined logical state if the first reference position signal is not generated after the second position signal has been generated said predetermined number of times after generation of the first reference position signal and before an immediately succeeding generation of the second position signal;
    determining which of a plurality of predetermined combinations of logical states corresponds to a combination of logical states exhibited by the first and second flags;
    detecting an abnormality in one of the first reference position signal and second position signal based on the determined combination of logical states, the abnormality being such that a pulse of the first reference signal or the second position signal is missing or that a redundant pulse is superimposed on the first reference position signal or the second position signal;
    counting the number of times the predetermined combination occurs consecutively; and
    detecting the abnormality if the value of the count exceeds a set value.

2. The method as claimed in claim 1 wherein an abnormality is detected in the first reference position signal when the first flag but not the second flag is set to its predetermined logical state.

3. The method as claimed in claim 1 wherein an abnormality is detected in the second position signal when the second flag but not the first flag is set to its predetermined logical state, or both the first and second flags are set to their predetermined logical states.

4. The method as claimed in claim 1, further comprising the step of dividing the plurality of predetermined combinations of logic states into a first combination of logic states indicative of abnormality in the generation of the first reference position signal, and a second combination of logic states indicative of abnormality in the generation of the second position signal.

5. A method of detecting an abnormality in a crank angle signal of an internal combustion engine having a crankshaft, said abnormality being such that a pulse of the crank angle signal is missing or that a redundant pulse is superimposed on the crank angle signal, comprising the steps of:
    monitoring the condition of a first reference position signal generated at a predetermined crank angle position of the crankshaft and the condition of a second position signal generated whenever the crankshaft rotates through a predetermined rotational angle;
    setting a first flag to a predetermined logical state if the first reference position signal is generated before the second position signal is generated a predetermined number of times after generation of the first reference position signal;
    setting a second flag to predetermined logical state if the first reference position signal is not generated after the second position signal has been generated said predetermined number of times after generation of the first reference position signal and before and immediately succeeding generation of the second position signal;
    determining which of a plurality of predetermined combinations of logical states corresponds to a combination of logical states exhibited by the first and second flags;
    detecting an abnormality in one of the first reference position signal and second position signal based on the determined combination of logical states, the abnormality being such that a pulse of the first reference signal or the second position signal is missing or that a redundant pulse is superimposed on the first reference position signal or the second position signal;
    counting the number of times the predetermined combination occurs during a predetermined monitoring period; and
    detecting the abnormality if the value of the count exceeds a set value.

6. The method as claimed in claim 5 wherein an abnormality is detected in the first reference position signal when the first flag but not the second flag is set to its predetermined logical state.

7. The method as claimed in claim 5 wherein an abnormality is detected in the second position signal when the second flag but not the first flag is set to its predetermined logical state, or both the first and second flags are set to their predetermined logical states.

8. The method as claimed in claim 5, further comprising the step of dividing the plurality of predetermined combinations of logic states into a first combination of logic states indicative of abnormality in the generation of the first reference position signal, and a second combination of logic states indicative of abnormality in the generation of the second position signal.

9. A method of detecting an abnormality in a crank angle signal of an internal combustion engine having a crankshaft, said abnormality being such that a pulse of the crank angle signal is missing or that a redundant pulse is superimposed on the crank angle signal, comprising the steps of:
    monitoring the condition of a first reference position signal generated at a predetermined crank angle position of the crankshaft and the condition of a second position signal generated whenever the crankshaft rotates through a predetermined rotational angle;

setting a first flag to a predetermined logical state if the first reference position signal is generated before the second position signal is generated a predetermined number of times after generation of the first reference position signal;

setting a second flag to a predetermined number of times after generation of the first reference position signal and before an immediately succeeding generation of the second position signal;

determining which of a plurality of predetermined combinations of logical states corresponds to a combination of logical states exhibited by the first and second flags;

detecting an abnormality in one of the first reference position signal and second position signal based on the determined combination of logical states, the abnormality being such that a pulse of the first reference signal or the second position signal is missing or that a redundant pulse is superimposed on the first reference position signal or the second positions signal, wherein an electronic control unit for controlling the engine comprises:

first ignition control means for setting ignition timing at an optimum value in dependence upon engine operating parameters; and second ignition control means for effecting ignition control dependent solely upon the first reference position signal;

said method including the step of effecting a changeover from said first ignition control means to said second ignition control means when an abnormality is detected in the crank angle signal.

10. The method as claimed in claim 9 wherein an abnormality is detected in the first reference position signal when the first flag but not the second flag is set to its predetermined logical state.

11. The method as claimed in claim 9 wherein an abnormality is detected in the second position signal when the second flag but not the first flag is set to its predetermined logical state, or both the first and second flags are set to their predetermined logical states.

12. The method as claimed in claim 9 further comprising the step of dividing the plurality of predetermined combinations of logic states into a first combination of logic states indicative of abnormality in the generation of the first reference position signal, and a second combination of logic states indicative of abnormality in the generation of the second position signal.

13. A method of detecting an abnormality in a crank angle signal of an internal combustion engine having a crankshaft, said abnormality being such that a pulse of the crank angle signal is missing or that a redundant pulse is superimposed on the crank angle signal, comprising the steps of:

monitoring the condition of a first reference position signal generated at a predetermined crank angle position of the crankshaft and the condition of a second position signal generated whenever the crankshaft rotates through a predetermined rotational angle;

setting a first flag to a predetermined logical state if the first reference position signal is generated before the second position signal is generated a predetermined number of times after generation of the first reference position signal;

setting a second flag to a predetermined logical state if the first reference position signal is not generated after the second position signal has been generated said predetermined number of times after generation of the first reference position signal and before an immediately succeeding generation of the second position signal;

determining which of a plurality of predetermined combinations of logical states corresponds to a combination of logical states exhibited by the first and second flags;

detecting an abnormality in one of the first reference position signal and second position signal based on the determined combination of logical states, the abnormality being such that a pulse of the first reference signal or the second position signal is missing or that a redundant pulse is superimposed on the first reference position signal or the second position signal;

dividing the plurality of predetermined combinations of logic states into a first combination of logic states indicative of abnormality in the generation of the first reference position signal and a second combination of logic states indicative of abnormality in the generation of the second position signal;

counting the number of times each of the first and second combinations of the logic states occurs consecutively; and detecting the abnormality if each of the counts exceeds a first or second value set, respectively, for the first and second combinations.

14. The method as claimed in claim 13, wherein the first set value is less than the second set value.

15. A method of detecting an abnormality in a crank angle signal of an internal combustion engine having a crankshaft, comprising the steps of:

monitoring the condition of a first reference position signal generated at a predetermined crank angle position of the crankshaft and the condition of a second position signal generated whenever th ⓡcrankshaft rotates through a predetermined rotational angle;

setting a first flag to a predetermined logical state if the first reference position signal is generated before the second position signal is generated a predetermined number of times after generation of the first reference position signal;

setting a second flag to a predetermined logical state if the fist reference position signal is not generated after the second position signal has been generated said predetermined number of times after generation of the first reference position signal and before an immediately succeeding generation of the second position signal;

detecting an abnormality in one of the first reference position signal and second position signal based on a predetermined combination of logical states exhibited by the first and second flags;

counting the number of times the predetermined combination occurs consecutively; and detecting the abnormality if the value of the count exceeds a set value.

16. A method of detecting an abnormality in a crank angle signal of an internal combustion engine having a crankshaft, comprising the steps of:

monitoring the condition of a first reference position signal generated at a predetermined crank angle position of the crankshaft and the condition of a second position signal generated whenever the crankshaft rotates through a predetermined rotational angle;

setting a first flag to a predetermined logical state if the first reference position signal is generated before the second position signal is generated a predetermined number of times after generation of the first reference position signal;

setting a second flag to a predetermined logical state if the first reference position signal is not generated after the second position signal has been generated said predetermined number of times after generation of the first reference position signal and before an immediately succeeding generation of the second position signal;

detecting an abnormality in one of the first reference position signal and second position signal based on a predetermined combination of logical states exhibited by the first and second flags;

counting the number of times the predetermined combination occurs during a predetermined monitoring period; and detecting the abnormality if the value of the count exceeds a set value.

17. A method of detecting an abnormality in a crank angle signal of an internal combustion engine having a crankshaft, wherein an electronic control unit for controlling the engine comprises:

first ignition control means for setting ignition timing at an optimum value in dependence upon engine operating parameters; and second ignition control means for effecting ignition control dependent solely upon a first reference position signal, comprising the steps of:

monitoring the condition of the first reference position signal generated at a predetermined crank angle position of the crankshaft and the condition of a second position signal generated whenever the crankshaft rotates through a predetermined rotational angle;

setting a first flag to a predetermined logical state if the first reference position signal is generated before the second position signal is generated a predetermined number of times after generation of the first reference position signal;

setting a second flag to a predetermined logical state if the first reference position signal is not generated after the second position signal has been generated said predetermined number of times after generation of the first reference position signal and before an immediately succeeding generation of the second position signal;

detecting an abnormality in one of the first reference position signal and second position signal based on a predetermined combination of logical states exhibited by the first and second flags; and effecting a changeover from said first ignition control means to said second ignition control means when an abnormality is detected in the crank angle signal.

* * * * *

UNITED STATES PATENT AND TRADEMARK OFFICE
CERTIFICATE OF CORRECTION

PATENT NO.    : 4,788,956

DATED         : December 6, 1988

INVENTOR(S)   : Yoshio Suzuki, Shigehiro Kimura

It is certified that error appears in the above-identified patent and that said Letters Patent is hereby corrected as shown below:

Column 12, claim 15, line 41 change "th R" to --the--.

Signed and Sealed this

Seventeenth Day of April, 1990

Attest:

HARRY F. MANBECK, JR.

*Attesting Officer*    *Commissioner of Patents and Trademarks*